United States Patent [19]

Michael et al.

[11] 4,031,742

[45] June 28, 1977

[54] LEAK DETECTOR USING MASS CONCENTRATION GAUGE

[76] Inventors: Gerald C. Michael, 5946 Linton Lane, Indianapolis, Ind. 46220; Murvyn M. McDowell, 721 Coleman Ave., Fairmont, W. Va. 26554

[22] Filed: Feb. 11, 1975

[21] Appl. No.: 549,093

Related U.S. Application Data

[63] Continuation-in-part of Ser. No. 469,966, May 13, 1974, abandoned, which is a continuation of Ser. No. 295,913, Oct. 10, 1972, abandoned.

[52] U.S. Cl. ............................................ 73/40.7
[51] Int. Cl.² ........................................ G01M 3/04
[58] Field of Search .............. 73/40.7, 49.3, 49.2; 324/33

[56] References Cited

UNITED STATES PATENTS

| | | | |
|---|---|---|---|
| 2,897,437 | 7/1959 | Briggs et al. | 324/33 |
| 3,446,958 | 5/1969 | Combow et al. | 324/33 |

*Primary Examiner*—Donald O. Woodiel
*Attorney, Agent, or Firm*—Woodard, Weikart, Emhardt & Naughton

[57] ABSTRACT

A device is disclosed for rapidly testing items for leaks. The device incorporates a mass concentration gauge. One such gauge has a sensor which has an α-emitting radioactive source to ionize gases in a space between two electrodes. Associated electronic circuitry is disclosed which automatically indicates when a leak is detected. Other gauges to measure mass concentration are disclosed which use sensors directed to dielectric variation, magnetic permeability variation, acoustic velocity variation and optical index of refraction variation. All sensors are sensing properties which are completely or relatively insensitive to temperature variations.

38 Claims, 16 Drawing Figures

LEAK DETECTOR USING MASS CONCENTRATION GAUGE

RELATED APPLICATIONS

This application is a Continuation-in-Part of an application filed May 13, 1974, Ser. No. 469,966, now abandoned, which was a Continuation of an application filed Oct. 10, 1972, Ser. No. 295,913, now abandoned

BACKGROUND OF THE INVENTION

1. Field of the Invention

This invention relates to a leak detector, that is, a device which may be used for detecting the presence of a leak in a vessel by measuring the mass concentration of the gas in the vessel when a pressure differential exists between the inside and the outside of the vessel.

2. Description of the Prior Art

The classic method for testing for leaks consists of pressurizing a test piece with air and submerging the test piece under water for a period of time. Leaks can be detected by observation of bubbles emerging at the point of the leak. It has also been known to measure for leaks by pressurizing the test piece to a known pressure, sealing the test piece and then detecting whether or not the pressure changes after a period of time. Any change in pressure indicates a leak. A third method involves the use of tracer gases and in such a method a tracer gas may be introduced into a vessel under pressure. A device which is sensitive to the tracer gas can then be moved about the exterior of the vessel until leakage of the gas is sensed. U.S. Pat. No. 3,585,845 to Cornell et al describes such a system. The above methods of leak detection all have disadvantages which make them unsuitable for mass produced products, in view of the fact that the time involved in making a test is typically quite long. In addition, submersion in water causes additional expense where wet parts or rusty parts are intolerable.

Detection of a change in pressure within a sealed test piece, conventionally has required considerable time and has been sensitive to error due to temperature changes. Patent 3,085,198 to Briggs et al discloses a system, however, which can measure pressure and detect leaks in pressurized vessels.

SUMMARY OF THE INVENTION

The invention relates to a device for detecting leaks which incorporates a mass concentration gauge. One embodiment of the invention uses an extremely sensitive gauge which uses a radioactive source to enhance electrical conduction between two electrodes, this conduction being detected as an indication of molecular concentration. The invention as embodied in the disclosure herein does not require special tracer gases, but rather the disclosed embodiments can operate simply with air. In one embodiment, balanced amplifying stages are used to provide extremely good temperature compensation and field effect transistors are used to provide an extremely high impedance load on the sensing device. The electrodes in the sensing device are adjustable in order that a linear response may be obtained at various different operating pressures. In addition, sample and hold circuitry is used to give an automatic indication of a leak.

Because of the extreme accuracy and sensitivity of the sensor used, leaks as small as 0.000005 cc/sec can be detected and cycle times as short as 5 seconds are possible. Because of the extremely rapid cycle time and measurement of mass concentration rather than pressure, the system is essentially insensitive to temperature changes. The design of the sensor is such that it is relatively insensitive to contamination by foreign material.

The sensor of one embodiment of this invention actually measures the electrical conduction of radioactively ionized gas subjected to a relatively small field strength. For any given gas or mixture of gases, such as air, this parameter is proportional to mass concentration (density) and molecular concentration. With a proper scale, the invention can directly display the mass concentration of a given gas or mixture of gases. The invention does not, however, measure pressure and thus it is essentially insensitive to changes in temperature.

The sensors of other embodiments of this invention also measure parameters which are a function of mass concentration. These sensors are also essentially or relatively insensitive to changes in temperature. Although there may be some functional relationship between the parameters measured and temperature, the temperature relationship is of a second or third order relationship and does not affect the molecular density reading to an extent greater than the accuracy desired. Parameters such as ionization, dielectric current, magnetic permeability, acoustic velocity and optical index of refraction are all appropriate to measure in embodiments of this invention.

DESCRIPTION OF THE PREFERRED EMBODIMENTS

Figure 1:
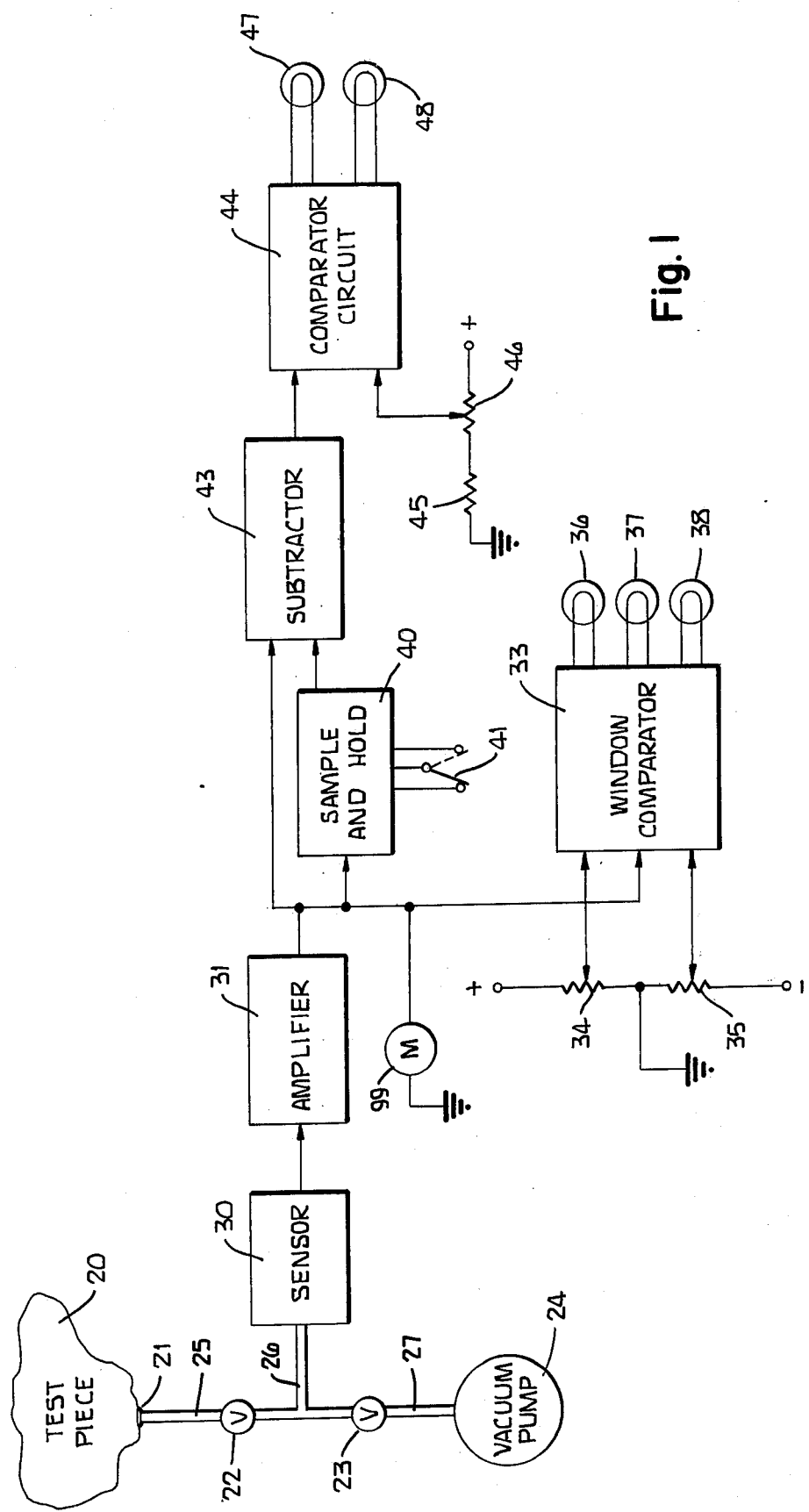
FIG. 1 illustrates a block diagram of apparatus embodying the invention.

Referring in particular to FIG. 1 there is illustrated a test piece 20 which is to be tested for leaks. The interior of the test piece 20 communicates with the interior of the chamber of a sensor 30 through tubing 25 and 26 and valve 22. A vacuum pump 24 provides a soft vacuum to the test piece through line tubing 27, 26 and 25 thus creating a pressure differential between the interior and exterior of the test piece 20. Valve 23 is present to readily seal off the vacuum pump from the test piece when it is desired to test for leaks.

The means of leak testing a vessel can be approached in any one of four ways. The vessel can be evacuated or pressurized, with the leak detector directly connected to the interior of the vessel. In addition, the vessel can be placed in an enclosure and the space between the vessel and enclosure can be either pressurized or evacuated. The leak detector can then be connected to the space between the vessel and the enclosure in which it was placed, or to the interior of the vessel. What is important is that a pressure differential be created between the interior and the exterior of the test piece and that the sensor be connected to a sealed chamber, the walls of which include the test piece.

The output of the sensor 30 is amplified by amplifier 31 and will be representative of the air pressure within the test piece. A meter 99 can be used to monitor the amplifier output. More conveniently, a window comparator 33 with associated lights 36, 37 and 38 are used to monitor the output of amplifier 31 to determine whether or not the output is within a range which is desired. Potentiometer 34 adjusts the upper level of the window comparator and potentiometer 35 adjusts the lower level of the window comparator. If the output of amplifier 31 is between the levels set by potentiometers 34 and 35, light 37 will be energized. If the output of amplifier 31 is above or below the range, lights 36 or 38 respectively will be energized. Only one light will be energized at a time.

The output of amplifier 31 also connects to the input of a sample and hole circuit 40 which is of conventional design and which has a switch 41 which causes sampling when in the dotted line configuration and holding when in the solid line configuration. The output of amplifier 31 is compared with the previously sampled and hold circuit 40 by subtractor 43. This subtractor 43 will have an output whenever there has been a change in the output of amplifier 31 subsequent to the sampling operation of the sample and hold circuit. The output of subtractor 43 connects to a comparator circuit 44. Resistor 45 and potentiometer 46 are used to set a threshold voltage for operation of light 48 which is activated when a difference is detected between the amplifier 31 output and sample and hold circuit 40 output. When light 48 is not illuminated, light 47 is illuminated to indicate that there has been no leak detected.

Figure 2:
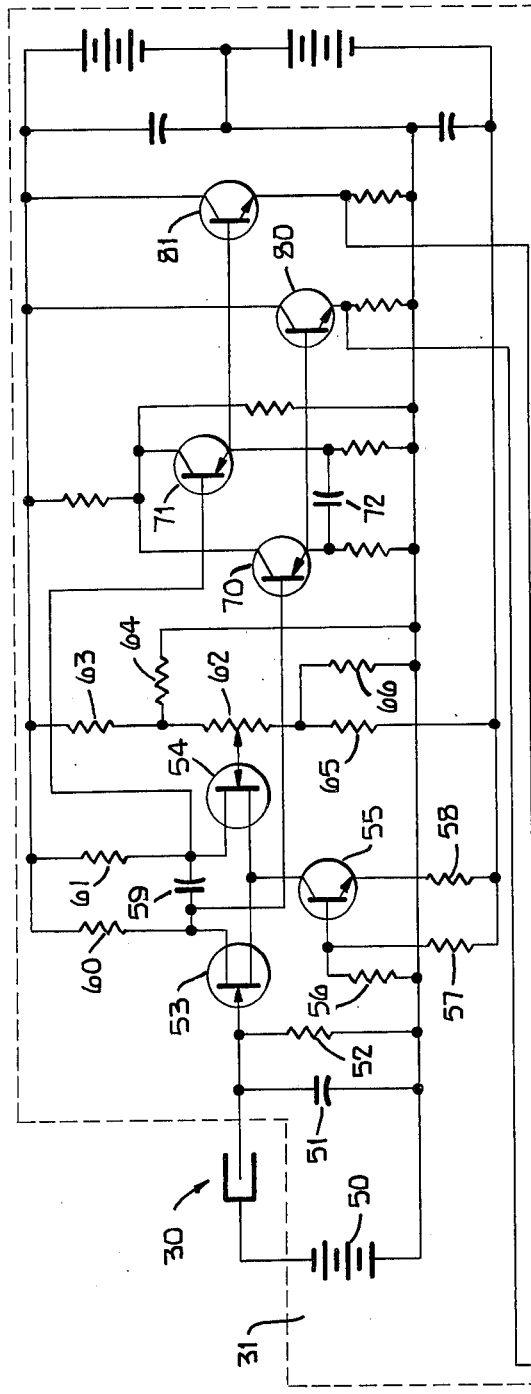
FIG. 2 illustrates a detailed schematic diagram of the electronic circuitry of FIG. 1.
Figure 2:
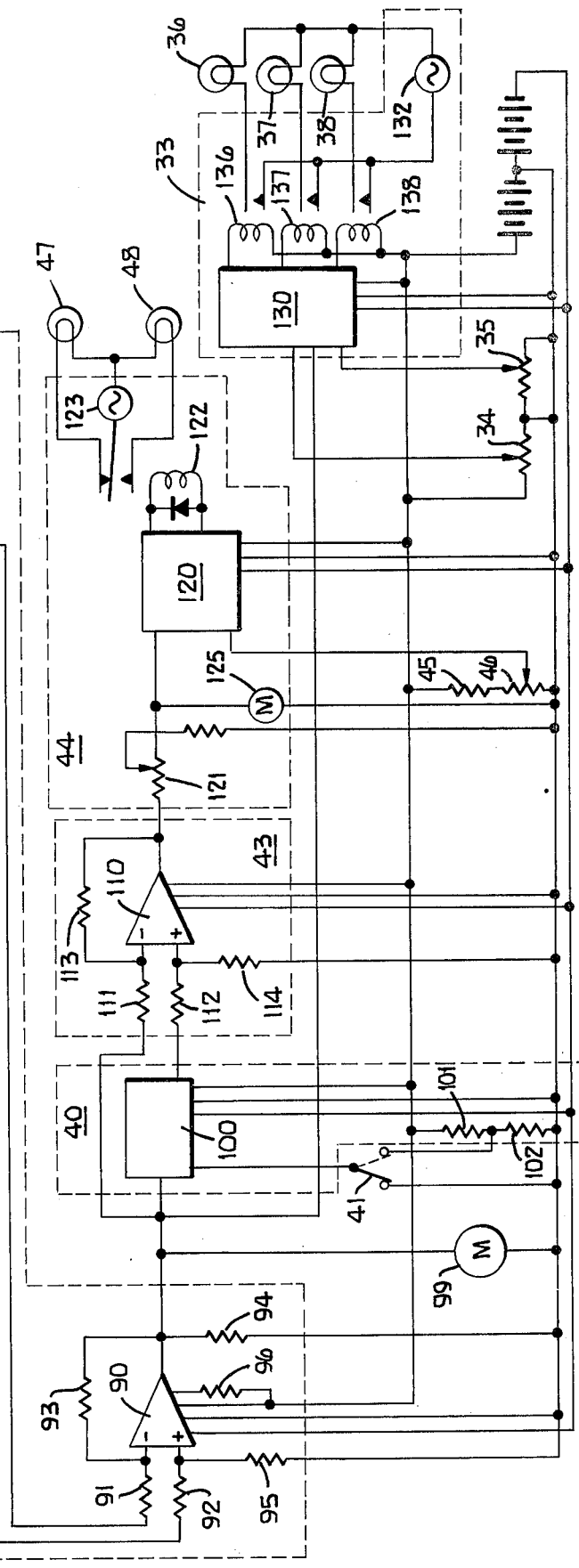

Referring in particular to FIG. 2 there is illustrated a battery 50 for supplying voltage (50 volts) to the sensor 30 through resistor 52 (5 gigohms). A capacitor 51 (75pf) is used to integrate the output of the sensor to minimize high frequency components. The current flowing through sensor 30 is detected by measuring the voltage developed across resistor 52 with transistor amplifying stages including two n-channel epitaxial planar silicon field effect transistors 53 and 54. The input impedance of such a transistor is on the order of $10^{13}$ ohms, thus giving amplifier 31 an extremely high impedance input. The gate of transistor 53 connects to one of the electrodes of sensor 30 and the gate of transistor 54 connects to a reference voltage obtained from potentiometer 62 and voltage dividing resistors 63–66.

The drains of transistors 53 and 54 are connected to the collector of transistor 55 which is biased with resistors 56–58. A capacitor 59 is connected between the two sources of transistors 53 and 54 to minimize high frequency components, and resistors 60 and 61 serve as load resistors for the two field effect transistors. The outputs of the two field effect transistors are push-pull in character and connect from the sources of transistors 53 and 54 through emitter follower transistor amplifier stages includes transistors 70, 71, 80 and 81 to operational amplifier 90. A capacitor 72 is connected between the emitters on transistors 70 and 71 to further minimize high frequency components of the signal from the sensor 30.

Isolation resistors 91 and 92 and resistors 93, 94, 95 and 96 serve to produce a linear response from an operational amplifier 90. The output of operational amplifier 90 can be monitored with meter 99. The function of the remaining circuitry of FIG. 2 has been described with respect to FIG. 1. Resistors 101 and 102 provide a reference voltage, and resistors 111 to 114 are simply biasing resistors. The individual integrated circuits are as follows:

| | |
|---|---|
| Operational amp 90 | 3308/12C |
| Sample and Hold 100 | 4034/25 |
| Operational amp 110 | 3308/12C |
| Comparator 120 | 4082/03 |
| Window Comparator 130 | 4115/04 |

The above circuits are made by Burr-Brown Research Corp., Tucson, Arizona.

A meter 125 can indicate the approximate size of a leak that is detected. A comparator 120 and window comparator 130 function through relays 122 and 136–138 to operate lights 47, 48, and 36–38. The voltage sources 123 and 132 supply power to energize the lights.

Figure 3:
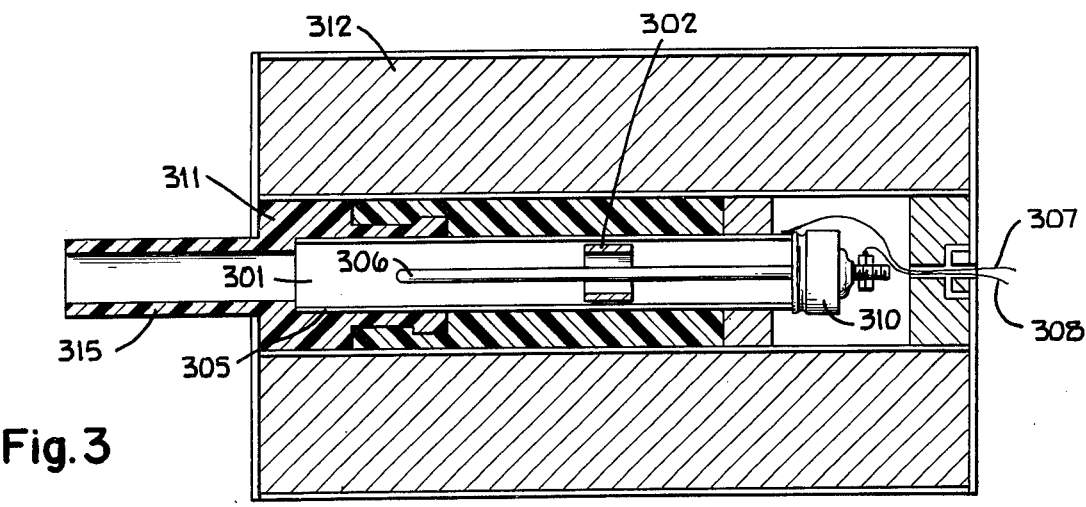
FIG. 3 illustrates an ion mass sensor which incorporates a radioactive material and which may be used in the apparatus of FIG. 1.

Sensors which may be used with this invention are shown in FIGS. 3–9. In FIG. 3, a chamber 301 is formed in part by a cylindrical outer electrode 305 an a rod shaped center electrode 306 which protrudes through an insulating end 310. Voltage is supplied to the electrodes through wires 307 and 308. Electrically insulating material 311 additionally serves to form chamber 301 and extends outwardly to form tubing 315 which connects to tubing 36 (shown in FIG. 1). The entire chamber 301 is surrounded by radiation shielding material 312 which shields radiation from a radioactive source 302 placed near the electrodes to ionize atoms or molecules of the gases which may exist between the two electrodes.

Figure 4:
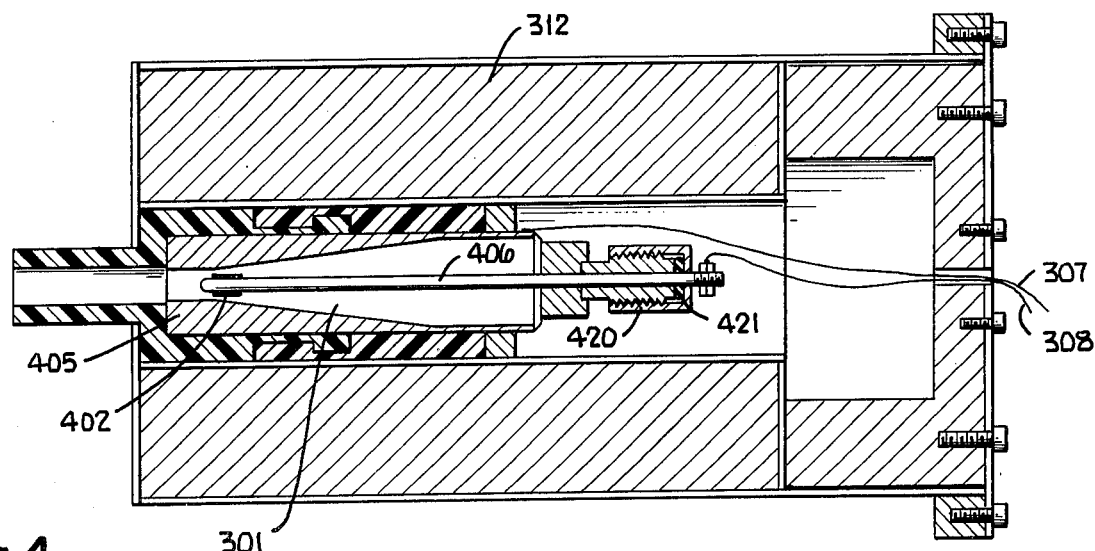
FIG. 4 illustrates an alternate ion mass sensor which may be used in the apparatus of FIG. 1 and which incorporates a variable distance between electrodes and a radioactive material near the electrodes.

In FIG. 4, there is illustrated a sensor similar to the sensor of FIG. 3, but which has a center electrode 406 which can be moved to vary the distance between the two electrodes 406 and 405 within the chamber 301. Once the desired position of the center electrode 406 has been obtained, a threaded cap 420 can be tightened to cause a gasket 421 to seal the electrode 406 into position. A radioactive source 402 is placed on the end of electrode 406 to ionize gas in chamber 301, and electrode 405 is designed with a tapered section, which is frusto-conical in shape to provide for adjustability.

Figure 5:
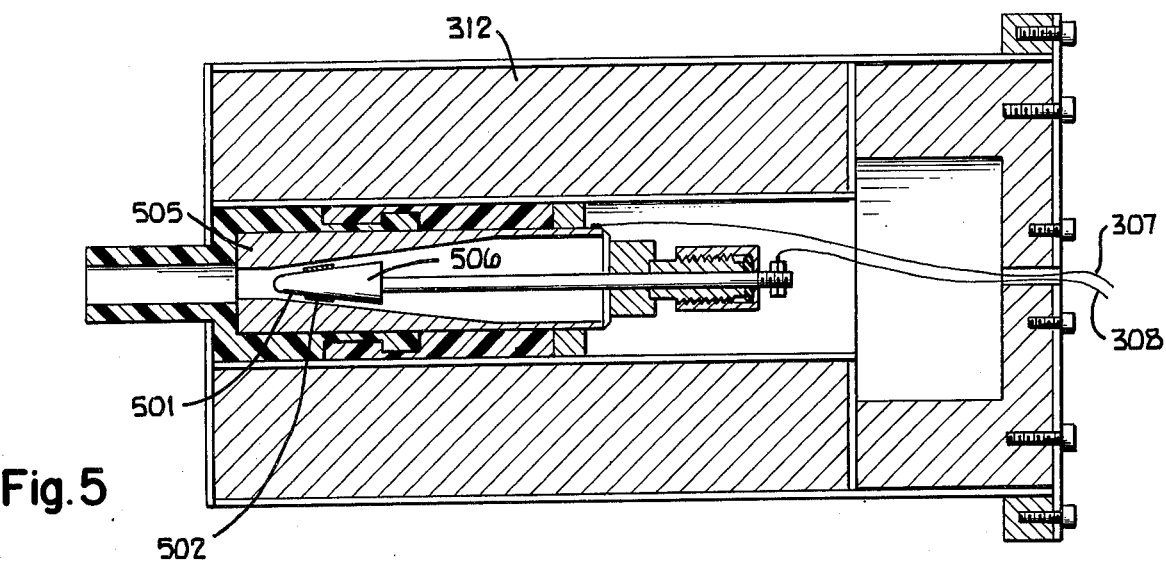
FIG. 5 illustrates yet another ion mass sensor which may be used in the apparatus of FIG. 1 and which also incorporates variable spacing between electrodes and a radioactive material near the electrodes.

FIG. 5 is very similar to FIG. 4 except that the center electrode 506 is tapered to be conical in shape at its end, in addition to the outer electrode 505 being tapered to have a section which is conical in shape near its end. The radioactive source 502 is placed near the end of the center electrode 506. The embodiment of FIG. 5 provides a rather uniform distance between electrodes over much of their surface area.

It is preferred that radioactive source 302, 402 and 502 be an α-emitting element such as americium 241 or radium 226. While β-emitting sources will function, the smaller size and mass of the particles makes them less effective in ionizing the gases and makes it more difficult to shield the radioactive material. A radioactivity of from 50 to 100 microcuries has been found quite satisfactory.

In operation of the apparatus of the invention just described, a test piece 20 is attached to a quick release fitting 21 and valve 22 and 23 are opened to allow vacuum pump 24 to evacuate the interior of the test piece 20. After a soft vacuum is obtained, valve 23 is closed and the sample and hold circuitry 40 is caused to hold the output of the amplifier 31. The illumination of light 37 indicates that the amplifier output voltage is within a range which is suitable for operation of the leak testing device. If light 48, which indicates that a leak exists, has not illuminated within 5 seconds after valve 23 has been closed, the test piece 20 is assumed to have no leaks. The sample and hold circuitry is then returned to the sample mode and valve 22 is closed to permit the removal of test piece 20. It will be noted that gases never flow through the sensor 30 and therefore the sensor does not tend to become contaminated.

Other sensors may be used in place of the sensors heretofore described. One key feature in all of these is that they include means for measuring the mass concentration of a gas essentially independently of the temperature of the gas. Ideally, there would be absolutely no variance of the measured parameter with changes in temperature. However, all techniques for measuring mass concentration are at least theoretically affected by temperature. For example, theoretically with the iron mass detectors previously discussed, a change of 100° C. in temperature from 0° C. to 100° C. would change the molecular density determination. However, even with such a drastic change the resultant change in molecular density reading would be so small that it could not be resolved by the associated equipment.

Other techniques for measuring mass concentration have some second or third order dependency on temperature. However, in practical leak detectors, the designs can be such that the measurements of mass concentration with these techniques can be essentially independent of temperature. This is of course in clear distinction to prior art leak detectors which use pressure sensing techniques which are of a first order dependency upon temperature.

Figure 6:
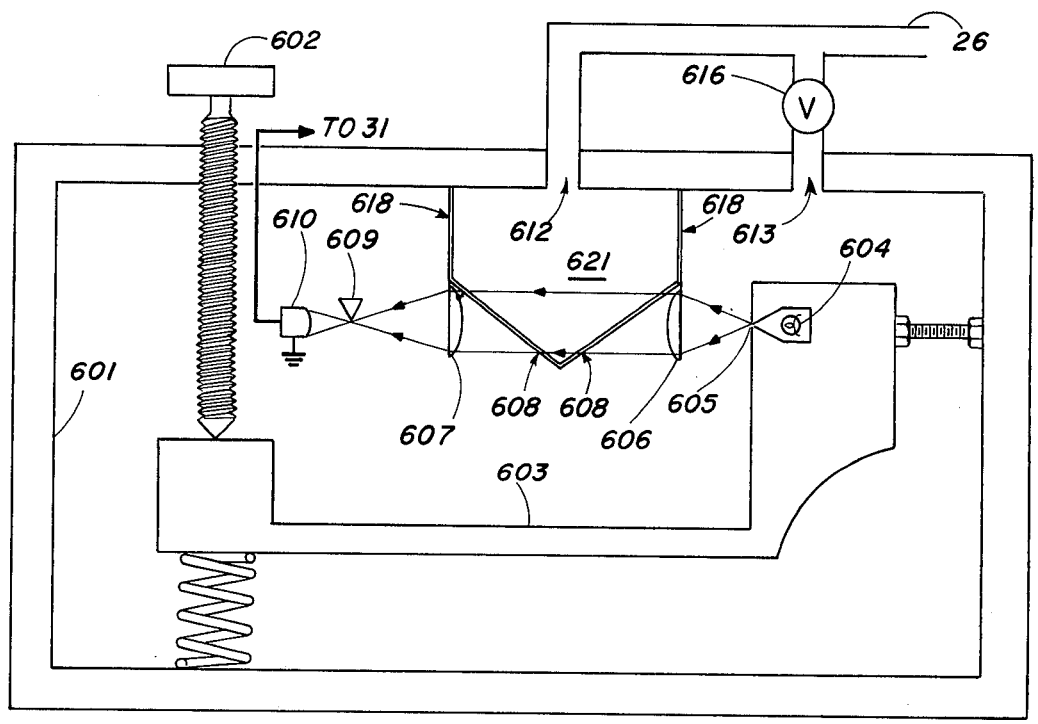
FIG. 6 illustrates an optical sensor which may be used in the apparatus of FIG. 1 and which senses changes in index of refraction of gases.

In FIG. 6, there is illustrated a sensor for producing an electrical signal which is a function of the index of refraction of a gas. The index of refraction of a gas is an appropriate parameter to measure to indicate the mass concentration of the gas. FIGS. 6a through 6g illustrate alternate arrangements of optical elements which may be used in a sensor of the type illustrated in FIG. 6.

The sensor of FIG. 6 is built within an enclosure 601 and has an adjustable main support member 603 which can be adjusted with the primary light adjustment 602. This adjustment raises and lowers the source of light 604 and the slit 605 through which the light from the source of light 604 emanates. The source of light 604 is an incandescent light source of constant amplitude. Slit 605 is formed by two knife edges.

Also within enclosure 601 is a light sensitive device 610 which produces an electrical resistance proportional to the amount of light falling upon it. This resistance is then used at the input of amplifier 31 of FIG. 1. Chamber 601 is enclosed in its entirety except for opening 613 which connects to a valve 616 to tubing 26.

The sensor of FIG. 6 incorporates means to vary the amount of light from the source 604 which reaches the light sensitive device 610 in response to the changes in molecular concentration of gas within tubing 26. In this embodiment, space 611 is contiguous with tubing 26 and changes of molecular concentration within space 611 are measured. This is accomplished by a light passing from the knife edge slit 605 through a lens 606 to achieve approximately parallel rays of light. These light rays pass through glass slats 608 which form an air prism. The rays then continue to pass through lens 607 and adjacent knife edge 609 to impinge upon the light sensitive device 610. Knife edge 609 could alternatively be a slit. It is desirable that knife edge 609 be adjustable in position so that optimal sensitivity can be achieved under varying conditions. In addition to glass slats 608, space 611 is defined by sealing walls 618 and a portion of the wall of enclosure 601. Space 611 connects to the interior of tubing 26 through hole 612.

In operation, the apparatus of FIG. 6 is adjusted with valve 616 open. Adjustments are made so that parallel rays emanate from lens 606 and so that a focused line impinges at knife edge 609, with only a portion of the light on the focused line passing past knife edge 609 to impinge upon the light sensitive device 610. Valve 616 is then closed. Subsequent variations in the resistance of the light sensitive device 610 are indicative of molecular concentration of the gas within space 611. This procedure may be carried out by making the above adjustments while tubing 26 is connected as shown in FIG. 1 through valve 22 to a pressurized or evacuated test piece. After closure of valve 616, any change in mass concentration within the space 611 is indicated.

In differential mode, valve 616 will be opened prior to each leak test and closed at the start of each test. In absolute mode, valve 616 remains closed after initial adjustment. As an alternative, valve 616 could be positioned differently than shown. It could be positioned to control the connection from tubing 26 to hole 612 and tubing 26 could connect directly to hole 613. Similar results would be achieved.

Figure 6A:
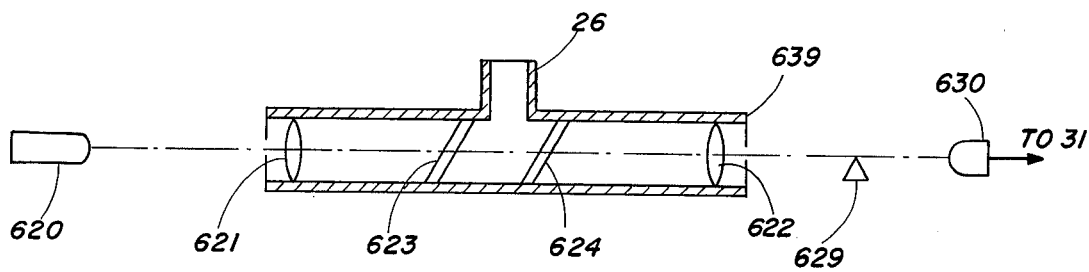
FIGS. 6a–6e illustrate alternate arrangements of optical elements which may be used in a sensor of the type illustrated in FIG. 6.

In FIGS. 6a through 6h, additional alternative configurations of light sources, optical elements and light sensitive devices are shown. In FIG. 6a, light source 620 is focused into parallel rays by lens 621 which then passes through a glass trapezoid composed in part of glass slats 623 and 624. These slats provide two walls of a chamber within tubing 639 to which tubing 26 is connected. At the other end of tubing 639, lens 622 focuses the parallel rays impinging upon it to knife edge 629. Detector 630 then detects the percentage of the focused light that passes knife edge 629. The output of light sensitive device 630 than connects to the amplifier 31 shown in FIG. 1. It may be noted that the sensor of FIG. 6a measures in an absolute mode rather than in a differential mode. In an absolute mode, the output of the light sensitive device is an essentially direct measure of molecular concentration while in the differential mode the output is a measure of the change in molecular concentration.

Figure 6B:
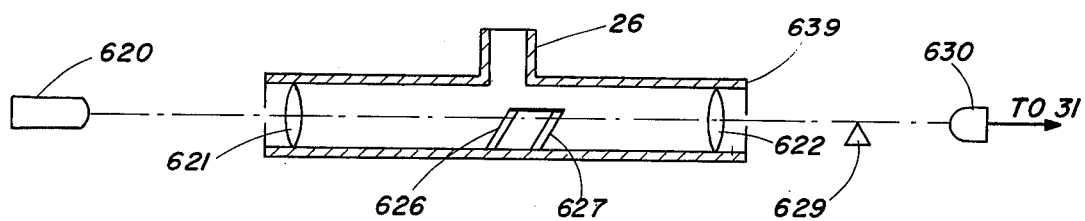

In FIG. 6b, there is illustrated a variation of the sensor of FIG. 6a in which the glass trapezoid incorporating glass slats 623 and 624 is replaced by a shorter glass trapezoid incorporating slats 626 and 627. In this embodiment, the tubing 26 does not connect to the interior of the glass trapezoid but rather it connects to the exterior of the glass trapezoid. In this embodiment and in certain others, the ability of lenses 621 and 622 to produce parallel rays is affected by the mass concentration of the gas in tubing 26.

Figure 6C:
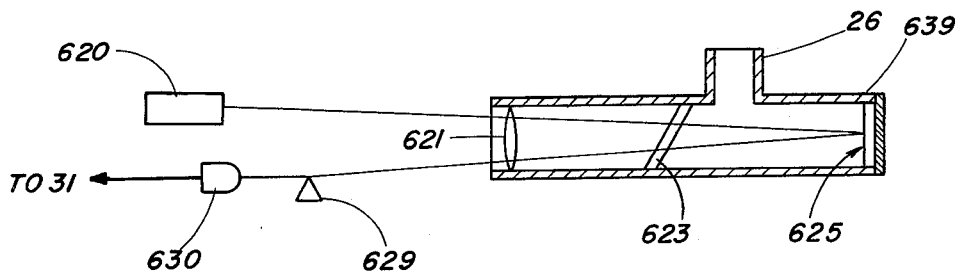
Figure 6D:
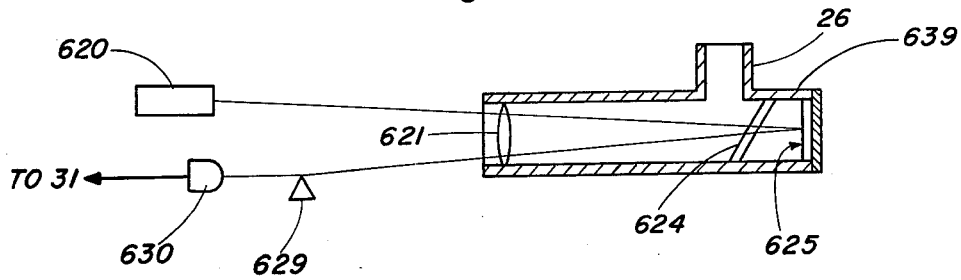
Figure 6E:
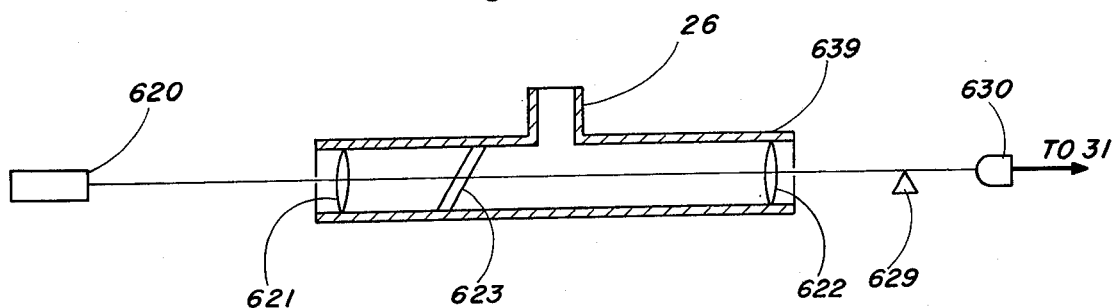

FIGS. 6c and 6d illustrate two alternative arrangements which may be substituted for the optical system of FIG. 6. These both incorporate a mirror 625 within tubing 639 and serve to reduce the size of the apparatus. Still another embodiment as shown in FIG. 6e uses only one glass slat 623.

Figure 6F:
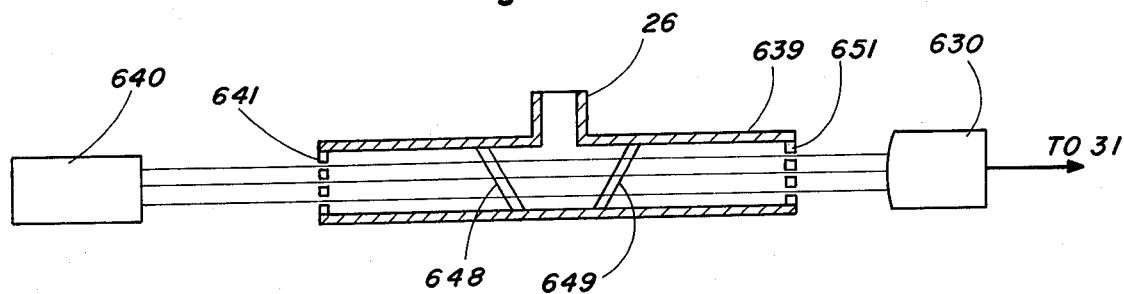
FIGS. 6f and 6g illustrate additional alternate arrangements of optical elements which may be used in a sensor of the type illustrated in FIG. 6 and which include a pair of congruent gratings to assist in detecting changes in optical density.

In place of an incandescent light bulb and a focusing lens, a laser 640 may be used to produce parallel light. As is shown in FIG. 6f, an optical system can be made using a laser which produces parallel coherent light rays. These light rays can pass through a grating 641, through two glass slats 648 and 649 within a tubing 639 and through a second grating 651 which is congruent with the first grating 641. The light passing through the second grating can then be measured by a light sensitive device 630.

Figure 6G:
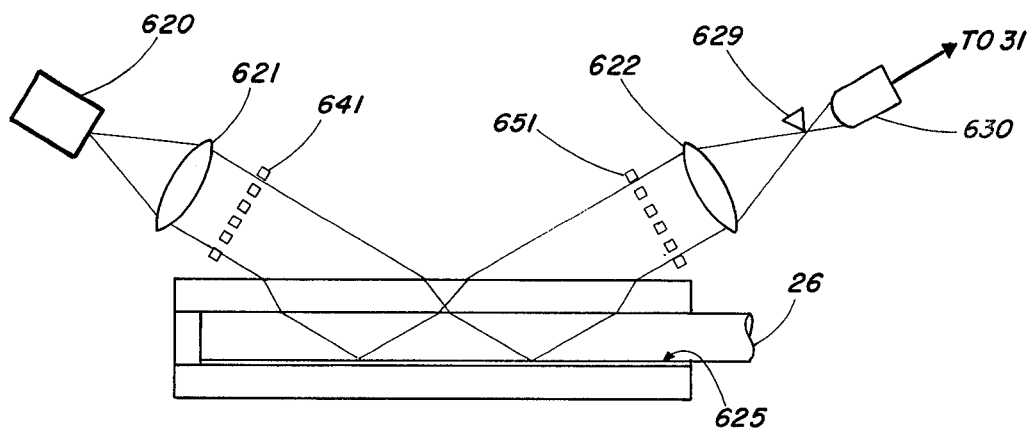

A still further embodiment incorporating gratings is shown in FIG. 6g. In this illustration of an optical system, a light source 620 is focused into parallel rays by lens 621. These rays then pass through grating 641, through flat glass 660 and into a chamber which connects to tubing 26. A reflective surface 625 within the chamber reflects the light back through the flat glass 660 and to a second grating 651. The light passing through grating 651 is then focused by lens 622 to a knife edge 629 and the light which passes the knife edge is sensed by light sensitive device 630 which then connects to amplifier 31 shown in FIG. 1.

Figure 7:
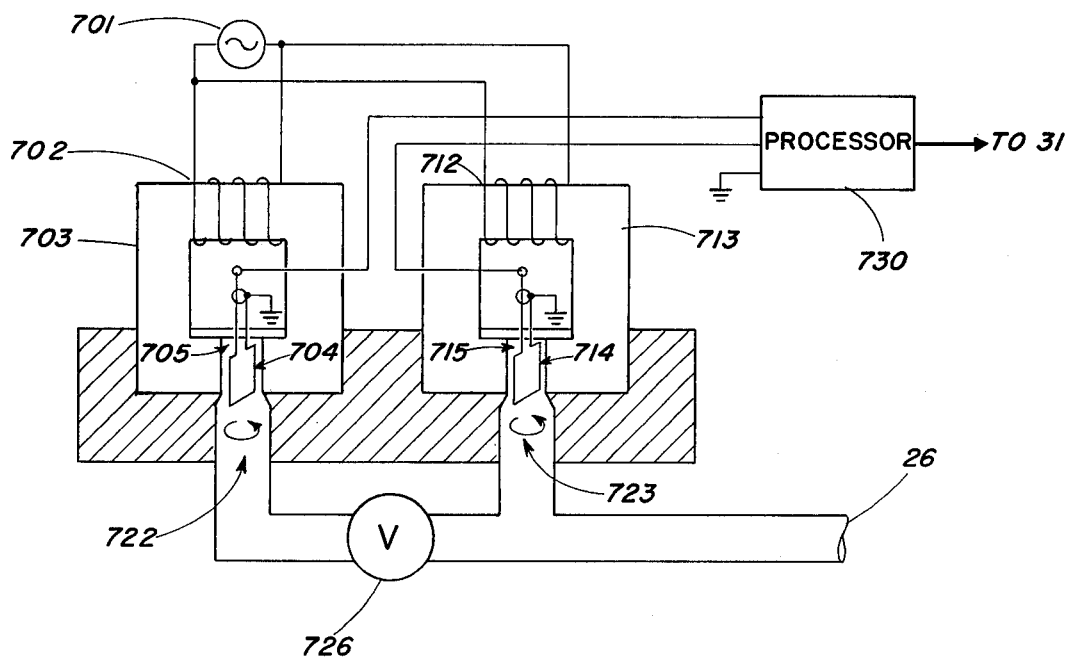
FIG. 7 illustrates a magnetic permeability sensor which may be used in the apparatus of FIG. 1.

Referring now to FIG. 7, there is illustrated a magnetic permeability sensor which may be used in the apparatus of FIG. 1. This sensor measures mass concentration of a gas by producing an electrical signal which is a function of magnetic permeability of the gas. The sensor preferably operates in a differential mode, but operation in an absolute mode is also possible. A source of alternating current 701 is connected to two identical coils 702 and 712 which are wrapped around corresponding iron cores 703 and 713. Each of the cores has a gap 705 and 715 through which the magnetic flux must pass. The amount of flux which passes through the gases within gap 705 and 715 is detected by rotating loops of conductive material 704 and 714 which rotate within the gap and produce an electrical signal proportional to the magnetic flux passing through the gas within the gaps 705 and 715. The loops 704 and 714 are caused to rotate in synchrony by conventional mechanisms not shown.

Tubing 26 connects directly to the gap 715 and through valve 726 to gap 705. To operate in differential mode, the item to be tested for leaks is pressurized or evacuated, as desired, with valve 726 open. Valve 23 is then closed and valve 726 is then closed. A leak is then detected by changes in phase or amplitude between the outputs of loops 714 and 704. A processor 730 functions to convert the signals from the loops 704 and 714 to an appropriate signal for amplifier 31 of FIG. 1.

Figure 8:
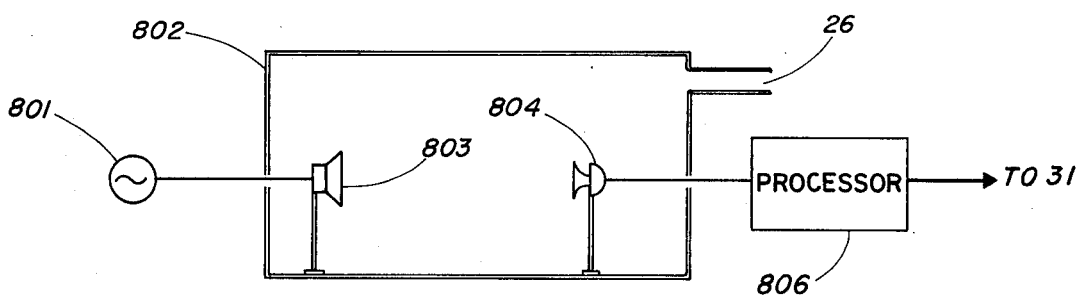
FIG. 8 illustrates an acoustical sensor which may be used in the apparatus of FIG. 1.

Referring now to FIG. 8, there is illustrated an acoustical sensor which may be used with the apparatus of FIG. 1. The device illustrated operates upon the theory that devices which measure the speed of sound in a gas can be used as a means for measuring the mass concentration of a gas which is essentially independent of temperature. A source of alternating current 801 is connected to a speaker 803 within a chamber 802. Chamber 802 connects to tubing 26 and eventually through valve 22 to test piece 20. Also within chamber 802 is a microphone 804 which connects to a processor 806 to provide a suitable signal for connection to amplifier 31 of FIG. 1. The source of sound provided by the alternating current generator 801 and speaker 803 should be of a frequency which is slightly different from the resonant frequency of chamber 802 at the operational mass concentration of gas within the chamber. Chamber 802 must have at least one acoustically resonant frequency and it is preferred that the frequency be the fundamental frequency of the chamber and be a relatively high frequency in order that the chamber size may be relatively small compared to the volume of tubing 26, tubing 25 and the interior of test piece 20. By having the source of sound be of a single frequency which is slightly different from the resonant frequency of chamber 802, slight changes in molecular concentration within the chamber result in rather substantial changes in amplitude detected by microphone 804. The term microphone and speaker as used herein are used in a general sense to encompass any transducer suitable for acoustical use.

As an alterative to the specific technique shown in FIG. 8, it is possible to eliminate the microphone 804 and simply detect changes in impedance of the speaker 803. The technique set forth above as to an acoustical scheme may also be used with radio frequency signals and correspondingly resonant cavities. The signal produced in the embodiment of FIG. 8 will be an electrical signal which is a function of the speed of sound in the gas within chamber 802. Therefore it will be, essentially independent of temperature, a measure of the mass concentration of the gas within the chamber 802.

Figure 9:
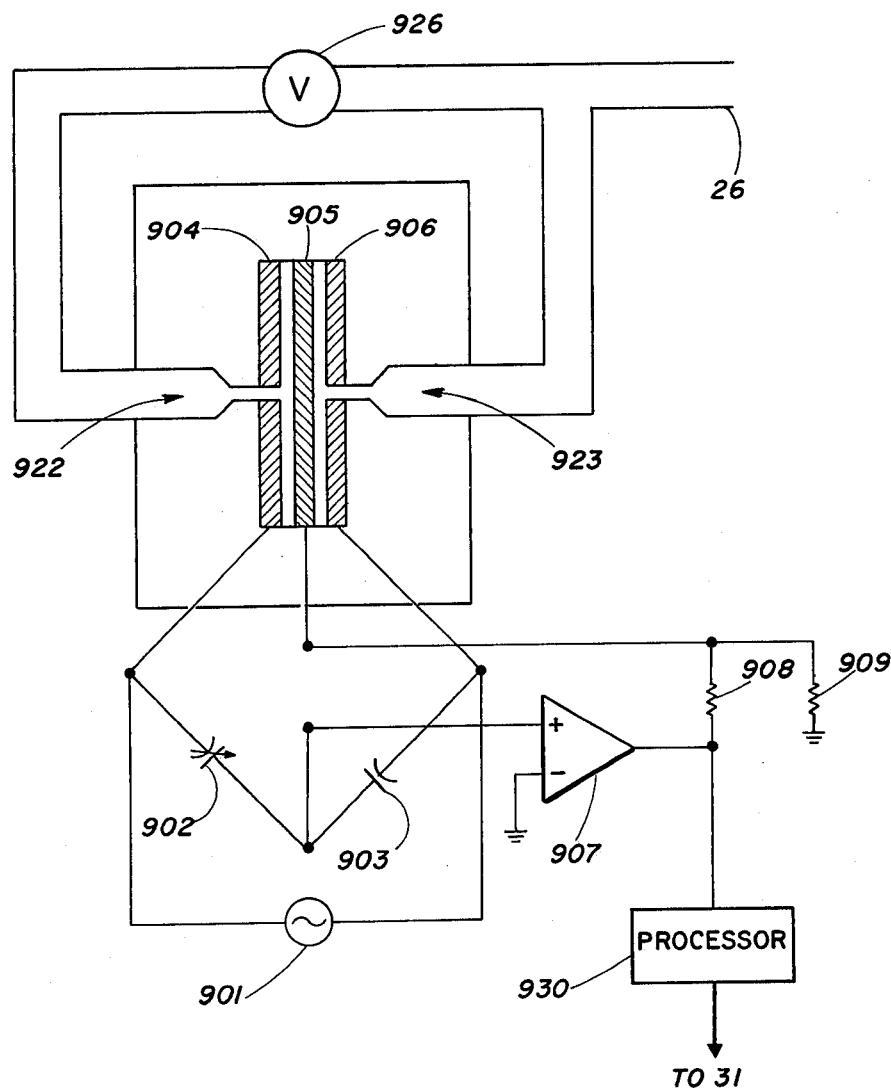
FIG. 9 illustrates a dielectric constant sensor which may be used in the apparatus of FIG. 1.

Referring to FIG. 9, there is illustrated a dielectric constant sensor which may be used in the apparatus of FIG. 1. The dielectric constant of a gas is of first order dependency on the mass concentration of the gas. The sensor of FIG. 9 is basically a differential mode detector which can be operated as an absolute mode detector by a permanent closing of valve 926. The sensor of FIG. 9 measures mass concentration of a gas by producing an electrical signal which is a function of the dielectric constant of the gas. Two capacitors are formed one consisting of plates 905 and 906 and the other consisting of plates 905 and 904. These capacitors have as their dielectric the gas which is to be measured. The capacitor formed by plates 905 and 906 connects through passageway 903 to tubing 26. The other capacitor having plates 905 and 904 connects through passageway 922 and through valve 926 to tubing 26. A source of alternating current 901, producing a ten kilocycle square wave, attaches to a bridge circuit comprised of the two capacitors formed of plates 904, 905 and 906 and two additional capacitors 902 and 903. Capacitor 902 may be used to achieve a null with the bridge circuit. Resistors 908 and 909, amplifier 907 and processor 930 are used to provide a signal to amplifier 31 of FIG. 1.

In operation, the vessel to be tested for leaks is either pressurized or evacuated and valve 23 is closed and capacitor 902 is adjusted for achieving a null output of the bridge circuit. Valve 926 is then closed and any changes in the output of the bridge circuit are indicative of a leak in the test piece. The circuit functions to sense changes in the capacitance of the capacitor formed of plates 905 and 906. Such changes result in changes of mass concentration of the gas which serves as the dielectric for the capacitor.

It should be understod that the test piece 20 is preferably readily removable in order that the leak detection device may be efficiently used in testing mass produced articles. While there have been described in connection with specific apparatus certain principles of this invention, it is to be clearly understood that this description is made only by way of example and not as a limitation to the scope of the invention.

What is claimed is:

1. A device useful for detecting leaks which comprises:
   a. means for measuring the mass concentration of a gas essentially independently of the temperature of the gas, said means including:
      1. a chamber,
      2. two electrodes spaced apart from each other, the space between them being within said chamber,
      3. a radioactive source placed near said electrodes to ionize any gases which may exist between said electrodes,
      4. impedance measuring means for applying a voltage across said two electrodes and for detecting current flowing between said two electrodes when voltage is applied across said two electrodes;
   b. a test piece to be tested for leaks, said test piece having an interior and surfaces surrounding the interior;
   c. connecting means for providing communication between the interior of said chamber and the interior of said test piece;
   d. a valve; and
   e. pressure means communicating with said test piece through said valve for creating a pressure differential between the interior and the exterior of said test piece, whereby after closure of the valve a subsequent change of mass concentration within said test piece is indicative of a leak.

2. The device of claim 1 in which said radioactive source is an α- emitting source.

3. The device of claim 1 which includes means for adjusting the space between said two electrodes.

4. The device of claim 3 which one of said electrodes has a tapered section.

5. The device of claim 4 in which both of said electrodes have a tapered section.

6. The device of claim 5 in which said tapered sections are conical in shape and positioned coaxially.

7. The device of claim 1 which additionally includes:
   a. a sample and hold circuit having its input connected to said impedance measuring means; and
   b. means connected to said sample and hold circuit and to said impedance measuring means or detecting a difference between the output of said sample and hold circuit and the output of said impedance measuring means, whereby said difference can be indicative of a leak.

8. The device of claim 7 in which said means for detecting a difference includes a light source and means for activating said light source only when a difference is detected.

9. The device of claim 7 which additionally includes a first visual indicator and means to energize said first visual indicator only when said output of said means for detecting current is within a predetermined range.

10. The device of claim 9 which additionally includes second and third visual indicators, and means or energizing one of said second and third visual indicators only when said output of said means for detecting current is above said predetermined range and for energizing the other only when said output of said means for detecting current is below said predetermined range.

11. The device of claim 1 in which said impedance measuring means includes a first field effect transistor, the gate of which couples to one of said electrodes.

12. The device of claim 11 in which said impedance measuring means also includes a second field effect transistor, the drain of which connects to the drain of said first field effect transistor.

13. The device of claim 12 in which said impedance measuring means also includes a third transistor connected to the rain of said first field effect transistor.

14. The device of claim 13 in which said impedance measuring means also includes two direct coupled emitter follower transistor amplifying stages, one connected to the source of each of said first and second field effect transistors.

15. The device of claim 14 in which said impedance measuring means also includes an operational amplifier, the inputs of which are coupled to the outputs of said two amplifying stages.

16. A device useful for detecting leaks which comprises:
   a. a chamber;
   b. two electrodes;
   c. means for adjustably positioning said two electrodes spaced an adjustable distance apart from each other with the space between them being within said chamber;
   d. a radioactive source placed near said electrodes to ionize any gases which may exist between said electrodes;
   e. impedance measuring means connected to said two electrodes for applying a voltage across said two electrodes and for detecting current flowing between said two electrodes when voltage is applied across said two electrodes;
   f. a test piece to be tested for leaks;
   g. connecting means for providing communication between the interior of said chamber and the interior of said test piece; and
   h. pressure means communicating with said test piece for creating a pressure differential between the interior and the exterior of said test piece.

17. The device of claim 16 in which one of said electrodes has a tapered section.

18. The device of claim 17 in which both of said electrodes have a tapered section.

19. The device of claim 18 in which said tapered sections are conical in shape and positioned coaxially.

20. A device useful for detecting leaks which comprises:
   a. a chamber;
   b. two electrodes;

c. means for positioning said two electrodes to be spaced apart from each other with the space between them being within said chamber;
d. a radioactive source placed near said electrodes to ionize any gases which may exist between said electrodes;
e. impedance measuring means connected to said two electrodes for applying a voltage across said two electrodes and for detecting current flowing between said two electrodes when voltage is applied across said two electrodes;
f. a sample and hold circuit having its input connected to said impedance measuring means;
g. means connected to said smaple and hold circuit and to said impedance measuring means for detecting a difference between the output of said sample and hold circuit and the output of said impedance measuring means;
h. a test piece to be tested for leaks;
i. connecting means for providing communication between the interior of said chamber and the interior of said test piece; and
j. pressure means communicating with said test piece for creating a pressure differential between the interior and the exterior of said test piece.

21. The device of claim 20 in which said means for detecting a difference includes a light source and means for activating said light source only when a difference is detected.

22. The device of claim 20 which additionally includes a first visual indicator and means to energize said first visual indicator only when said output of said means for detecting current is within a predetermined range.

23. The device of claim 22 which additionally includes second and third visual indicators, and means connected to said impedance measuring means for energizing one of said second and third visual indicators only when said output of said impedance measuring means is above said predetermined range and for energizing the other only when said output of said impedance measuring means is below said predetermined range.

24. A device useful for detecting leaks which comprises:
a. a chamber;
b. two electrodes;
c. means for positioning said two electrodes to be spaced apart from each other with the space between them being within said chamber;
d. a radioactive source placed near said electrodes to ionize any gases which may exist between said electrodes;
e. impedance measuring means connected to said two electrodes for applying a voltage across said two electrodes and for detecting current flowing between said two electrodes when voltage is applied across said two electrodes;
f. said impedance measuring means including a first field effect transistor, the gate of which couples to one of said electrodes;
g. a test piece to be tested for leaks;
h. connecting means for providing communication between the interior of said chamber and the interior of said test piece; and
i. pressure means communicating with said test piece for creating a pressure differential between the interior and the exterior of said test piece.

25. The device of claim 24 in which said impedance measuring means also includes a second field effect transistor, the drain of which connects to the drain of said first field effect transistor.

26. The device of claim 25 in which said impedance measuring means also includes a third transistor connected to the drain of said first field effect transistor.

27. The device of claim 26 in which said means also includes two direct coupled emitter follower transistor amplifying stages, one connected to the source of each of said first and second field effect transistors.

28. The device of claim 27 in which said means also includes an operational amplifier, the inputs of which are coupled to the outputs of said two amplifying stages.

29. A device useful for detecting leaks which comprises:
a. means for measuring the means concentration of a gas essentially independently of the temperature of the gas;
b. a test piece having a surface to be tested for leaks;
c. means for forming an enclosure, the walls of which include said surface of said test piece; said enclosure being completely sealed except for any leaks which may exist in said surface of said test piece;
d. means for creating a pressure differential across said surface of said test piece when it is included in the wall of said enclosure; and
e. said means for measuring mass concentration being arranged to measure the mass concentration of gas within said enclosure.

30. The device of claim 29 in which said means for measuring includes:
1. a chamber;
2. two electrodes spaced apart from each other, the space between them being within said chamber;
3. a radioactive source placed near said electrodes to ionize any gases which may exist between said electrodes; and
4. impedance measuring means for applying a voltage across said two electrodes and for detecting current flowing between said two electrodes when voltage is applied across said two electrodes.

31. The device of claim 29 in which said means for measuring includes a sample and hold circuit and means for detecting a difference between the input of the sample and hold circuit and the output of the sample and hold circuit.

32. The device of claim 31 in which said means for detecting a difference includes a light source and means for activating said light source only when a difference is detected.

33. The device of claim 29 in which said means for measuring the mass concentration of a gas includes means for producing an electrical signal which is a function of the index of refraction of a gas and which includes:
a. a source of light directed through the gas;
b. a light sensitive device; and
c. means varying the amount of light from said source reaching said light sensitive device in response to changes in molecular concentration of the gas.

34. The device of claim 33 in which said source of light is of constant amplitude.

35. The device of claim 29 in which said means for measuring the mass concentration of a gas includes means for producing an electrical signal which is a function of magnetic permeability of the gas and which includes:
   a. a source of magnetic flux positioned to cause flux to pass through the gas; and
   b. means for sensing changes of magnetic flux passing through the gas.

36. The device of claim 29 in which said means for measuring the mass concentration of a gas includes means for producing an electrical signal which is a function of the speed of sound in the gas and which includes:
   a chamber having at least one acoustically resonant frequency containing the gas to be measured;
   b. a source of sound in said chamber of a single frequency which is slightly different from said resonant frequency; and
   c. means responsive to said source of sound or producing an electrical signal which is a function of the speed of sound in said chamber.

37. The device of claim 29 in which said means for measuring the mass concentration of a gas includes means for producing an electrical signal which is a function of the dielectric constant of a gas:
   a. a capacitor having the gas as a dielectric; and
   b. means for sensing changes in capacitance of said capacitor which result in changes in mass concentration of the gas dielectric.

38. The device of claim 29 in which said test piece is readily removable.

* * * * *

UNITED STATES PATENT OFFICE
CERTIFICATE OF CORRECTION

Patent No. 4,031,742           Dated     June 28, 1977

Inventor(s)    Gerald C. Michael & Murvyn M. McDowell

It is certified that error appears in the above-identified patent and that said Letters Patent are hereby corrected as shown below:

Column 3, Line 42, at the beginning of that line please add the following words --output from the sample--.

Column 3, Line 56, please correct "(5 gigohms)" to --(25 gigohms)--.

Column 5, Line 34, please correct "wOuld" to --would--.

Column 9, Line 11, please correct "understod" to --understood--.

Column 9, Line 64, please change "or" to --for--.

Column 10, Line 26, please change "rain" to --drain--.

Column 11, Line 14, please correct "smaple" to --sample--.

Signed and Sealed this

*Eleventh* Day *of October 1977*

[SEAL]

*Attest:*

RUTH C. MASON            LUTRELLE F. PARKER
*Attesting Officer*    *Acting Commissioner of Patents and Trademarks*